United States Patent

Vosteen

[15] 3,673,343

[45] June 27, 1972

[54] ANTI-JAMMING CIRCUIT FOR MULTI-FREQUENCY SIGNAL DETECTOR

[72] Inventor: Robert E. Vosteen, 315 W. Center St., Medina, N.Y. 14103

[22] Filed: Nov. 21, 1968

[21] Appl. No.: 777,770

[52] U.S. Cl. ..........................179/84 VF, 307/229, 307/223, 325/473, 340/171

[51] Int. Cl. ..........................H04m 1/00

[58] Field of Search..................340/171; 325/473; 307/216, 307/229, 233; 179/84 SS, 84 VF

[56] References Cited

UNITED STATES PATENTS

| | | | |
|---|---|---|---|
| 3,341,815 | 9/1967 | Axe | 179/84 SS |
| 3,140,357 | 7/1964 | Bishof et al. | 179/84 VF |
| 3,128,349 | 4/1964 | Boesch et al. | 340/171 X |
| 3,183,414 | 5/1965 | Goetz | 340/171 X |

*Primary Examiner*—Benjamin A. Borchelt
*Assistant Examiner*—H. A. Birmiel
*Attorney*—Irons, Stockman, Sears & Santorelli

[57] ABSTRACT

A jam-proof circuit for use with a multi-frequency signal detector system to prevent noise from erroneously actuating the detector system. The circuit employs substantially similar high and low-band exclusive OR circuits interposed between the output of the multi-frequency signal detector means and associated logic circuitry. The exclusive OR circuitry prevents noise from causing erroneous indications to be produced by the logic circuitry which comprises an individual AND gate corresponding to each digit that may be signalled. The digits are identified by the simultaneous transmission of a plurality of different frequencies.

11 Claims, 1 Drawing Figure

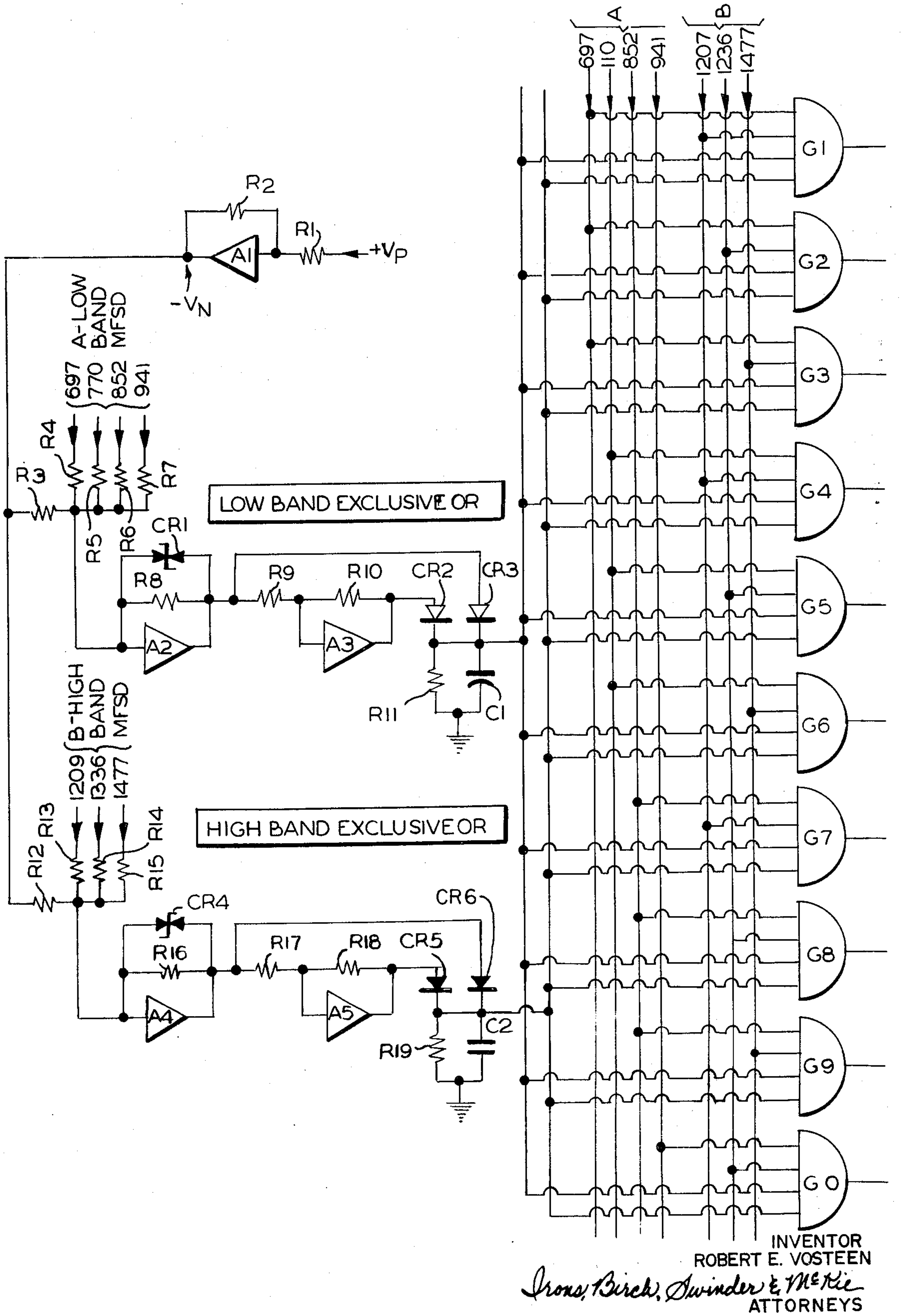
INVENTOR
ROBERT E. VOSTEEN
Irons, Birch, Swinder & McKie
ATTORNEYS

ANTI-JAMMING CIRCUIT FOR MULTI-FREQUENCY SIGNAL DETECTOR

BACKGROUND OF THE INVENTION

1. Field of the Invention

The invention relates to a jam-proof circuit for use with a multi-frequency signal detecting system to prevent noise from causing an erroneous indication at the output of the detector system. The invention has utility, for example, in telephony and radio communication systems.

2. Description of the Prior Art

Numerous prior art circuits are provided for encoding and decoding multi-frequency signals based upon the transmission of one or more discrete frequencies through communication systems such as telephony or radio. Such a decoder, in order to be practically useful, must be able to accept a wide range of input amplitudes, and a wide range of input amplitude ratios in the event that multiple simultaneous signals are applied. Further, the decoder must have a reasonable and acceptable range of frequency instability while still providing reliable decoding of applied signals.

A common multi-frequency system employs two distinct frequencies for identifying individual digits. This type of system is in common use in telephone systems and functions to transmit the two different frequencies upon actuation of switches corresponding to the digit to be transmitted. In this type of system, the following shows the frequencies of tone pairs corresponding to each digit:

| Digit | Tone Pairs (Hz) |
|---|---|
| 1 | 697 + 1209 |
| 2 | 697 + 1336 |
| 3 | 697 + 1477 |
| 4 | 770 + 1209 |
| 5 | 770 + 1336 |
| 6 | 770 + 1477 |
| 7 | 852 + 1209 |
| 8 | 852 + 1336 |
| 9 | 852 + 1477 |
| 0 | 941 + 1336 |

Analysis of the above table shows a matrix consisting of four lower frequency tones (697, 770, 852, and 941 Hz) and three upper frequency tones (1,209, 1,336, and 1,477 Hz) which, in selected combinations, identify particular ones of 10 digits (0 through 9). Larger matrices consisting of more than four lower frequency tones and three upper frequency tones may be employed and the use of less than two tones to identify individual digits is also possible. However, it has been found that the use of two tones to identify individual digits is adequate for voice communication systems since it is difficult to orally synthesize two simultaneously constant frequency tones consisting of relatively widely different and non-harmonically related frequencies.

When a telephone handset is being used in conjunction with multi-frequency dialing, the amplifier associated with the telephone is "live." It is, therefore, possible that loud, broadband orally generated noise may be intentionally introduced into the amplifier that may open the associated frequency selective gates. Normally two multi-frequency detectors would be employed, the first to receive and selectively detect one of the four lower frequencies described and the second to receive and selectively detect one of the three upper frequencies. The detecting operation would thus not be successful.

SUMMARY OF THE INVENTION

The invention provides for the use of substantially similar high and low-band exclusive OR circuits. These are connected to the output of the multi-frequency signal detector means and are designed to prevent noise from causing an erroneous indication at the output of the overall detector system.

AND gates are assigned to selectively indicate the presence of absence of a corresponding digit. Assuming that 10 digits may be signalled, 10 corresponding AND gates will be employed. The invention is described with relation to an illustrative example in which three high frequencies and four low frequencies are selectively used to indicate a particular digit. Thus simultaneous transmission of one low frequency and one high frequency is employed to be indicative of a particular digit.

It is the object of this invention to provide for detection of the tone-pairs and to preclude operation of the detector in response to noise applied to the microphone. The invention specifically precludes this form of noise jamming.

Another inherent defect in prior multi-frequency detectors is that short bursts of false outward signals may be produced during that period of time immediately following reception of the desired tone-pair. The anti-jamming circuit according to the invention precludes response to such false signals, just as it precludes response to intentional jamming.

BRIEF DESCRIPTION OF THE DRAWING

The FIGURE shows an electrical schematic diagram of the circuit of the invention.

DETAILED DESCRIPTION OF THE INVENTION:

The figure shows the use of positive and negative voltage reference supplies $V_P$ and $V_N$ respectively. There is no necessity to provide exceptional stability of the voltage reference supplies, as long as they track one another. Further, it is not necessary that the negative reference voltage supply be identical in voltage output to the positive reference voltage supply. The positive voltage supply operating the digital logic circuitry of associated multi-frequency detector means (not shown) may be used as the positive voltage reference supply. The negative voltage reference supply is developed by operational amplifier A1 which is connected to function as an inverting amplifier. Resistor R1 comprises the input resistor to amplifier A1 and feedback resistor R2 is connected between the output and input of amplifier A1. The values of resistors R1 and R2 are chosen to establish the voltage of amplifier A1 at a value approaching its maximum voltage capability for the selected load. The operational amplifier provides the negative voltage supply $V_N$ according to the following formula:

$$V_N = (-R2/R1)\ (V_P)$$

It is difficult to provide a digital multiple input exclusive OR circuit using standard microelectronic digital elements. The circuit according to the invention therefore uses an analog circuit that produces the desired operating performance using analog techniques. The exclusive OR circuit employed is relatively simple in nature and provides good noise immunity.

The high-band exclusive OR circuit is specifically indicated in the figure. It comprises operational amplifier A4 which functions as a multiple input summing amplifier having three identical input resistors R13, R14, and R15 coupled between the high-band multi-frequency signal detector means and the summing junction of amplifier A4. Signals corresponding to frequencies 1,209, 1,336, and 1,477 Hz are applied to amplifier A4 through resistors R13, R14, and R15 respectively, if detected by the multi-frequency signal detector means. In this regard the multi-frequency signal detector means may be of any conventional type. It is not illustrated because it is not necessary for an understanding of the invention. However, attention is directed to the multi-frequency signal detector means described in applicant's copending application, titled "-Multi-Frequency Signal Detector," filed simultaneously with this application, now U.S. Pat. No. 3,555,435 and which may be employed.

For the purpose of the description of this invention, digital 1 is a voltage approaching the digital supply voltage and digital 0 is a voltage approaching zero volts. The output of the multi-frequency signal detector means in the absence of signals at the frequency selected to be detected is digital 1. It is digital 0 when signals are applied at the frequency selected to be detected. Therefore, in the presence of a valid code consisting of the tone-pair corresponding to the digit signaled, one of the three OR inputs of amplifier A4 will be 0 and the other two will be 1. There are two exclusive OR circuits shown. A low-band exclusive OR circuit is connected to the output of that multi-frequency signal detector means which detects the low-band frequencies, and a high-band exclusive OR circuit is connected to that multi-frequency signal detector means which detects high-band frequencies.

The resistance of resistor R12 connected between the negative reference voltage supply $V_N$ and the the input of amplifier A4 is chosen such that a current is applied to the summing junction of amplifier A4 which is equal to twice the current of a single input signal applied to the OR inputs from the associated multi-frequency signal detector means. These input signals would be applied from the multi-frequency signal detector means which detects high-band frequencies to the input of the operational amplifier A4 of the high-band exclusive OR circuitry.

When a signal at one of the frequencies selected to be detected, either 1,209, 1,336, or 1,477 Hz is detected, the corresponding input applied to its corresponding OR input of amplifier A4 is 0, and substantially equal positive voltages are applied to each of the other OR input lines. Thus under such conditions, assuming that one of the three frequencies is detected, the net current input of the summing junction of amplifier A4 is 0. Thus feedback current is not produced in amplifier A4 and the amplifier correspondingly has a 0 output.

If no signal is applied to the multi-frequency signal detector means and all of its outputs are therefore positive, a net positive current will flow in feedback resistor R26 of amplifier A4. Resistor R16 is chosen to produce a voltage of approximately −5 volts output under these conditions.

In the event that signals of two of the three frequencies 1,209, 1,336, and 1,477 are applied to the input of the detector, two of the detector outputs will be accordingly 0. The net negative current then flowing in resistor R16 could then produce a positive output voltage greatly exceeding +5 volts. This signal could saturate amplifier A4 or the following connected circuitry which might be objectionable. Therefore, in order to prevent this condition from occuring, double anode zener diode CR4 is connected in parallel with resistor R16 to limit the output voltage of amplifier A4.

The output of amplifier A4 is therefore negative in the event that there is no detector output signals corresponding to reception of signals at one of frequencies 1,209, 1,336, and 1,477 Hz, and positive when more than one detector output exists corresponding to reception of signals at more than one of frequencies 1,209, 1,336, and 1,477 Hz.

The output of amplifier A4 is connected to the input of amplifier A5 which functions as a unity gain inverter amplifier. Resistor R17 is connected between amplifiers A4 and A5. Resistor R18, equal in resistance to resistor R17, is connected between the output and input of amplifier A5. Accordingly, the output of amplifier A5 comprises the inverted output of amplifier A4. The outputs of amplifiers A4 and A5 are connected to the common junction of resistor R19 and capacitor C2 through diodes CR6 and CR5 respectively. Resistor R19 and capacitor C2 are connected in parallel between their described common junction and comprise a parallel RC circuit.

In the event of a valid output from the multi-frequency signal detector means, one of the three OR inputs of amplifier A4 will be 0. The output of amplifier A4 and consequently the output of amplifier A5 will be 0. Diodes CR5 and CR6 will therefore not conduct and the output developed across resistor R19 will be consequently 0.

If other than one 0 exists from the multi-frequency signal detector means, either amplifier A4 or amplifier A5 will produce a positive output equal to approximately 5 volts. An output of approximately 4.5 volts will therefore be produced across resistor R19. The circuit thus performs the digital function of an exclusive OR circuit in that the output will be 0 if only one 0 exists at the input of amplifier A4, and positive if no 0 or a multiple 0 is at the input of amplifier A4. Diodes CR5 and CR6 may comprise similar small signal silicon diodes. They significantly enhance the noise and drift immunity of the circuit. The outputs of amplifiers A4 or A5 must exceed approximately +0.45 volts before a significant output can be produced across resistor R19.

The connection of capacitor C2 in parallel with resistor R19 provides a useful delay apparatus in the transient condition immediately following the application of a valid code to the input of the multi-frequency signal detector means. A pair of incorrect signal inputs could then exist for an extremely brief interval of time of approximately 2 milliseconds. Capacitor C2 functions as a peak holding capacitor which will delay the establishment of a 0 output condition until a suitable 0 output does exist. A second exclusive OR circuit is provided to function as a low-band exclusive OR circuit. It is specifically designated as such in the FIGURE. An examination thereof shows that it is similar to the described high-band exclusive OR circuit, with the exception that it provides four OR inputs to amplifier A2. This is required as the described two tone system of signaling transmits four low-band frequency signals. As described above, these are 697, 770,852, and 941 Hz. In order to establish the desired operating conditions, resistor R3 is selected to to provide for zero net current at the summing junction of amplifier A2 when a 0 signal is applied to one of the four OR inputs of amplifier A2.

Depending upon the signalling system employed, the number of inputs to amplifiers A2 and A4 can be varied. The figure shows an illustrative example of the invention and is not to be limited thereto.

The additional circuit means comprises the use of 10 AND gates to completely jam-proof the detector system. When a selected frequency is fed to the multi-frequency signal detector means, its corresponding output is driven to 0. In order to signal digit 1, the two frequencies 697 and 1,209 Hz are applied to the low and high band multi-frequency signal detector means through parallel input circuits. The corresponding 697 Hz output line of the low-band detector will display a 0, and the corresponding 1,209 Hz output line from the high band detector will also display a 0. All of the other output lines of the detector will be positive. In this condition, the low-band exclusive OR circuit will display a 0 and the high band exclusive OR circuit will similarly display a 0. This will indicate that only one low-band frequency exists and further that only one high band frequency exists.

The 10 AND gates are designated to correspond with the digit which they are designed to display. They are connected in a matrix. Each AND gate has four inputs. The first and second inputs are connected to the outputs of the high and low band exclusive OR circuits, respectively. The third and fourth inputs are connected to the corresponding output line of the multi-frequency signal detector means which indicate reception of the two tones corresponding to digit 1. The remaining nine AND gates corresponding to the remaining nine digits are similarly connected. Two of their four inputs are connected to the outputs of the high and low exclusive OR circuits and their remaining two inputs are connected to the output line of the multi-frequency signal detector means corresponding to the two tones indicative of the corresponding digit.

If the four inputs of AND-gate G1 are 0, a valid digit 0 code exists and AND-gate G1 will produce a corresponding 0 output. However, the outputs of all other AND gates will be binary 1. For example, referring to AND-gate G2, the 1,336 Hz input line will be positive and therefore AND-gate G2 will be enabled to produce a binary 1 output.

Reception of tones indicative of other digits will similarly cause the corresponding AND gate to produce a binary 0 output and all other AND gates a binary 1 output.

I claim:

1. A jam-proof decoder circuit to prevent noise from causing false indications for detecting signals at a number of different predetermined frequencies in low and high band frequency ranges comprising:

a plurality of first input sources corresponding in number to that of the different predetermined frequencies in the high band frequency range, a plurality of second input sources corresponding in number to that of the different predetermined frequencies in the low band frequency range, a high band digital exclusive OR circuit having a first amplifier, the plurality of first input sources being connected to a first common input terminal of the first amplifier, a low band digital exclusive OR circuit having a second amplifier, the plurality of second input sources being connected to a second common input terminal of the second amplifier, bias means connected to the first and second common input terminals to control the first and second amplifiers to assume output states corresponding to the signals applied to the first and second input sources respectively, logic means including a matrix array having a first group of lines individually connected to different ones of the first and second input sources and a second group of lines connected to the outputs of the high and low band exclusive OR circuits and including gating means to provide an indication of true signals at the predetermined frequencies which are present in the circuit.

2. A jam-proof decoder circuit as recited in claim 1 wherein the first and second amplifiers assume first output states when only one signal at one of the associated predetermined frequencies is applied to one of the plurality of first and second inputs, respectively, and second output states when no signal or more than one signal at the associated predetermined frequencies are applied to the plurality of first and second inputs, respectively.

3. A jam-proof decoder circuit as recited in claim 1 wherein the first and second amplifiers comprise operational amplifiers functioning as multiple input summing amplifiers.

4. A jam-proof decoder circuit as recited in claim 1 further comprising:

limiter means connected between the output and input of each of the first and second amplifiers to limit the outputs thereof in the event more than two signals at the predetermined frequencies are applied to their inputs.

5. A jam-proof decoder circuit as recited in claim 1 wherein the first and second amplifiers each comprise:

first and second operational amplifiers, the plurality of respective inputs being connected to the input of the first operational amplifier, delay means connected to the outputs of the first and second operational amplifiers to prevent erroneous indications during the initial transient response of the system, the delay means of the first and second amplifier means being connected to the logic means.

6. A jam-proof decoder circuit as recited in claim 5 wherein first and second amplifiers are interposed between the outputs of each first and second operational amplifier, respectively, and the delay means.

7. A jam-proof decoder circuit as recited in claim 6 wherein each of the second operational amplifiers connected to function as a unity gain inverter providing an output that is an inverted replica of the output of the respectively connected first operational amplifier.

8. An exclusive OR circuit comprising:

a plurality of inputs corresponding in number to that of different predetermined frequencies that may be applied thereto, the plurality of inputs being connected to a common input terminal of a first amplifier, bias means connected to the common input terminal of the first amplifier to control the latter to assume output states corresponding to the signals applied to the plurality of inputs, a second amplifier connected at its input to the output of the first amplifier, delay means connected to the outputs of the first and second amplifiers to prevent erroneous circuit output signals during the initial transient response of the circuit to input signals thereto, indicating means connected to the delay means responsive to provide an indication of signals at the predetermined frequencies that are present in the circuit.

9. An exclusive OR circuit as recited in claim 8 wherein first and second rectifiers are interposed between the outputs of the first and second amplifiers, respectively, and the delay means.

10. An exclusive OR circuit as recited in claim 9 wherein the second amplifier comprises a unity gain inverter providing an output that is an inverted replica of the output of the first amplifier.

11. An exclusive OR circuit as recited in claim 10 wherein the first and second amplifiers comprise operational amplifiers.

* * * * *